United States Patent [19]
Frazier

[11] Patent Number: 6,132,129
[45] Date of Patent: Oct. 17, 2000

[54] TETRAHEDRAL JOINT FOR FURNITURE SUPPORTS

[76] Inventor: Robert G. Frazier, 1872 N. Clybourn, #507, Chicago, Ill. 60614-4916

[21] Appl. No.: 09/118,250

[22] Filed: Jul. 17, 1998

[51] Int. Cl.⁷ ..................................................... F16B 12/00
[52] U.S. Cl. .......................... 403/219; 403/217; 403/382; 52/650.3; 52/656.9; 52/668
[58] Field of Search ..................... 403/219, 217, 403/218, 170, 171, 176, 382, 364; 52/650.3, 656.9, 668

[56] References Cited

U.S. PATENT DOCUMENTS

| | | | |
|---|---|---|---|
| 4,383,780 | 5/1983 | Davison | 403/219 |
| 5,185,982 | 2/1993 | Hostetler | 403/217 X |
| 5,285,612 | 2/1994 | Johnson | 403/382 X |

FOREIGN PATENT DOCUMENTS 0739196  6/1980  Russian Federation ............... 403/219

*Primary Examiner*—Lynne H. Browne
*Assistant Examiner*—John R. Cottingham
*Attorney, Agent, or Firm*—Myers & Associates, Ltd

[57] ABSTRACT

A joint system having one or more tetrahedral joints formed by three edge lapped flat pieces having complimentary open-ended slots which interlock in a construction composing one vertex of a tetrahedron. A plurality of tetrahedral joints can be interconnected by one or more interlocking flat pieces having open-ended slots at both ends to form a part of two or more tetrahedral joints in various configurations with other tetrahedral joints.

9 Claims, 3 Drawing Sheets

TETRAHEDRAL JOINT FOR FURNITURE SUPPORTS

BACKGROUND OF THE INVENTION

1. Field of the Invention

This invention relates in general to furniture components and more particularly, to a joint or system of joinery derived from tetrahedral construction which is useful for supporting various types of furniture.

2. Description of the Prior Art

Tables and other types of furniture have long been supported by many types of legs, columns, and other support structures having varying configurations. In the past, it has been particularly desirable to attain highly pleasing designs for such support structures, particularly when formed from a wood or other material. Often, furniture legs are beautified through elaborate carving or other distinctive characteristics so as to provide an aesthetically pleasing appearance. The achievement of such visibly pleasing support members generally requires considerable labor which can render such legs to be relatively expensive. In addition, most techniques of supporting furniture have relied on mechanical fasteners or adhesives to create joints and other connections. The use of such securement techniques can be time consuming in production and an additional cost to the furniture. It is also desirable to blend the objectives of beauty in a piece of furniture with utilitarian objectives, such as providing strength and superior stability in support. For these reasons, it is desirable in the prior art to provide a support technique for furniture having a highly pleasing appearance, being capable of economical production, and having a highly efficient design in strength and support.

SUMMARY OF THE INVENTION

It is therefore an objective of the present invention to provide an improved joint for furniture supports formed preferably from wood or any other material capable of being slotted in the manner described in the application. The three flat pieces of tetrahedral joint of the invention are uniquely slotted such that they interlock with each other to form a joint having high strength and stability. The three members are assembled so as to form an edge lapped joint in the shape of a tripod or, in conjunction with other similarly formed joints, more complex structures on which a table top or other piece of furniture may be supported. The joint of the invention is referred to as a tetrahedral joint because, other than being based on right angles, it is derived from analysis of possible relationships of the three members intersecting at one of the vertices of a tetrahedron (the angles of which may be either acute or obtuse or all one or the other).

Generally, the three members of the invention have angled open-end slots cut into each piece whereby the width of slots is equal to the thickness of each of the boards. The miter of the cut, which refers to the angle of the slot with respect to the leading edge of the flat wood piece, is preferably between 30° and 60° (either to the left or to the right) although is not so limited. The term "tilt" refers to the angle of the cutting tool with respect to a face of the flat wood piece and generally is, but not limited to, between 90° and 45° (either to the left or to the right).

Besides functioning as a tripod the joint can be configured in conjunction with other similar tetrahedral joints so that one or two more vertically positioned members of each joint are connected by the third member of each joint which forms a horizontal extension or trestle connecting to the adjacent joint. In this manner a table base, for example, consisting of two, three (not shown in drawings) four, or six interconnected tetrahedral joints can be constructed. The invention in its various applications thus provides a number of highly stable structures which can be easily fabricated by insertion of the three pieces of each tetrahedral joint within the slots in the particular arrangement required. By virtue of its interlocking construction the tetrahedral joint of the invention does not require mechanical fasteners or adhesives and yet provides a strong and stable support system. The configuration of the three members forming the tetrahedral joint or configuration with two or more joints provide a highly pleasing aesthetic look which is unique compared to the prior designs. The joints herein disclosed are economical to manufacture requiring only slots to be formed from flat pieces of wood or the like and are simple to assemble as support joints for a large number of furniture items. All of the embodiments of the invention and any variations thereof may also serve as ornamental objects by themselves without supporting other structures.

DESCRIPTION OF THE PREFERRED EMBODIMENTS

Figure 1:
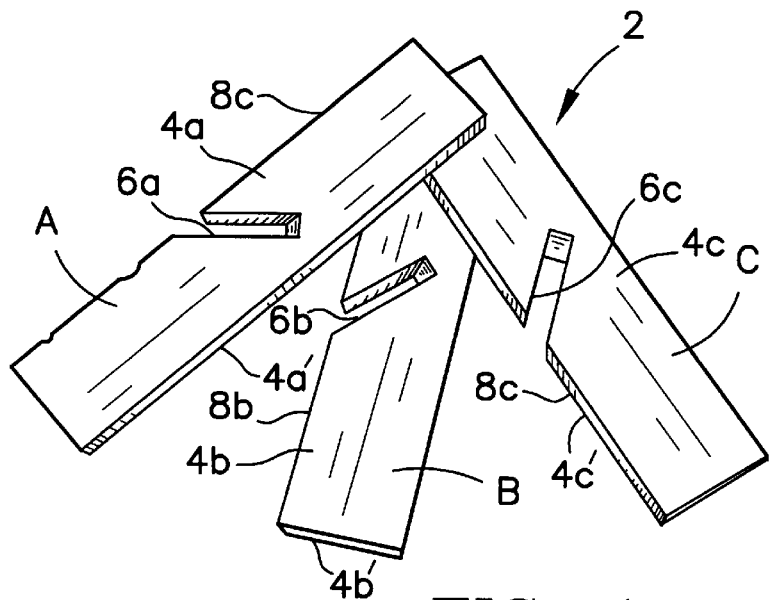
FIG. 1 a front elevational view of the flat slotted wood pieces prior to forming a first embodiment of the tetrahedron joint of the invention.
Figure 2:
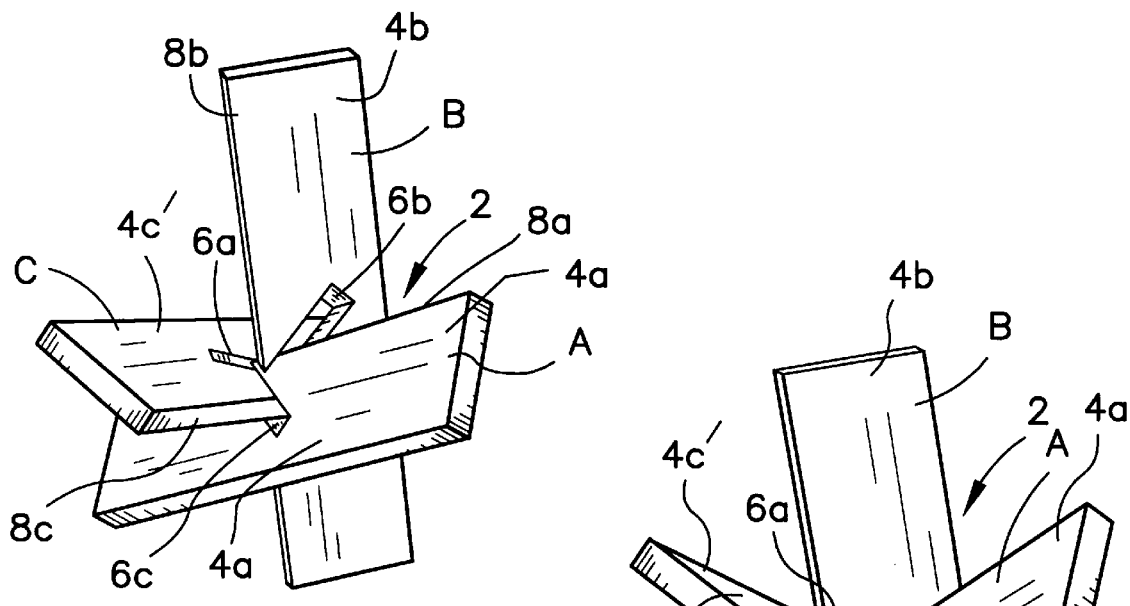
FIG. 2 is a side elevational view of the pieces of FIG. 1 in partial assembly from the pieces of FIG. 1
Figure 3:
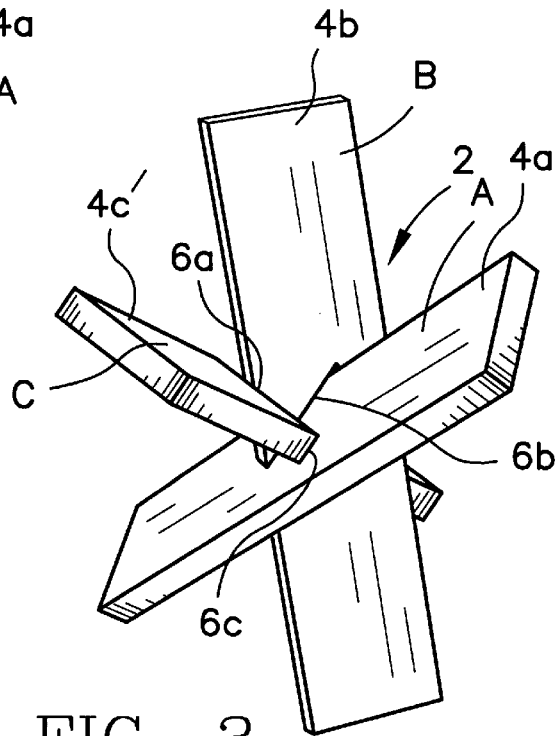
FIG. 3 is a side elevational view of the first embodiment of the tetrahedral joint of the invention formed from the pieces in assembly as shown in FIGS. 1 and 2.

Referring now to FIGS. 1–3, there is illustrated the first embodiment of the tetrahedral joint for furniture supports of the invention, generally designated by reference numeral 2. As seen in FIG. 1, which shows the boards forming the tetrahedral joint 2 prior to assembly, three flat pieces A, B, and C formed of wood or other material capable of being slotted as contemplated by the invention are used. Although the lengths of the pieces can be varied in accordance with desired results and aesthetic appearances, the invention contemplates the use of thicknesses of the pieces A, B, and C being equal and their width being approximately 4 to 8 times the thickness. It is also important in the invention of the application that the front faces 4a, 4b, 4c and back faces 4a', 4b', 4c' of each of the pieces A, B, and C be parallel to each other while the edges also be parallel to each other, though this latter is more a technical convenience during cutting of the slots than a necessity.

As seen in FIG. 1, each of the pieces A, B, and C includes an open ended slot 6a, 6b, and 6c having a width generally equal to the thickness of each piece A, B, and C. In the case of the first embodiment of the invention, slots 6a, 6b and 6c are cut at a miter angle of 45° with respect to the respective edges 8a, 8b, and 8c of each piece A, B, and C. The tilt of the cutting tool forming the slot is at 90° to face 4a, 4b, and 4c. In the embodiment of FIGS. 1–3, it is within the scope of the invention to vary the miter and tilt angles of the cut of slots 6a, 6b, and 6c to form other joint configurations as should be apparent. In making the open ended slots 6a, 6b and 6c, the length and width of the slots of the pieces 6a, 6b and 6c are all uniform. As seen in FIG. 2, the pieces A, B, and C are assembled in interlocking relationship by inserting the open ended slot 6a of piece A across, not into the slotted edge 60 of piece B and the slot 6c of C across the slotted edge of piece A and into the slot 6b in piece B, partially shown in FIG. 2. Through such an interconnected relationship to form joint 2, the miter angle of slot 6c with respect to slotted edge 8c and the tilt angle of slot 6c with respect to face 4c defines the plane on which face 4a lies, the miter angle and tilt angle of slot 6a defines the plane on which face 4b lies and the miter angle and tilt angle of slot 6b defines the plane on which face 4c lies. It should be noted that the kerf extends farther on one side of the boards than on the other depending on the position of the saw blade. This is important because piece B, for example, is at an angle to the edge of piece A in order to intersect the line of the cut of 90°. Therefore, if the slope of the end of the kerf in B is not parallel to the edge of piece A, slide it off and turn it over and reattach. Similarly, slide the cut in piece C over piece B at a right angle to the line of the cut so that the edges of the board fit into the slab of piece A. The resultant form is a tripod with the boards meeting in the vertex or intersection all at 90° to one another as shown in FIG. 3. Tripod forms in which the legs stand in a variety of angles to the floor from nearly vertical to nearly flat can be achieved by setting the diagonal or miter at or near 60° (if the miter is set at less than that than the leg tilts slightly and must be cut off at an angle to sit flat on the floor) and the tilt of the blade at whatever angle the design application dictates. The closer to 45° the blade is tilted, the lower the form of the tripod.

As seen in FIG. 3, the bottom ends of pieces A, B, and C can rest on a support surface whereby the top ends of pieces A, B, and C may support some article of furniture, such as a table top and the like. The tetrahedral joint 2 formed by the three interlocking pieces A, B, and C is highly stable, self locking, and strong even in the absence of any mechanical fasteners or adhesives due to the mutually reinforcing action of each board on the other two.

Figure 4:
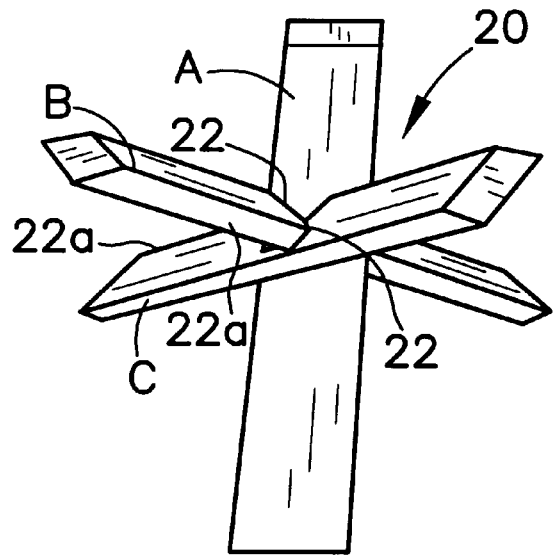
FIG. 4 is a front elevational view of the second embodiment of the tetrahedral joint of the invention.

Referring now to FIG. 4, there is illustrated a second embodiment 20 of the tetrahedral joint of the invention. The tetrahedral joint 20 shown in FIG. 4 includes three flat pieces A, B, and C of equal thickness and width, with open-ended slots 22 at a 55° miter angle with respect to the edge 22a and a 45° tilt of the cutting tool with respect to the flat face 24a. Using a sliding compound miter saw this setting is a 55° miter to the right and a 45° tilt to the left. The widths of the slot 22 are generally equal to the thickness of each piece A, B, and C. By altering the angles of the tilt and miter in comparison to the angles disclosed respectively in FIG. 1, a different configuration and a wider or narrower stance are obtained. Again, the three legs may be supported on a support surface while the top members can support a table or other structure. The intersection of pieces A, B, and C may also support one or more items, such as a book or a globe, or flower pot and the like.

Figure 5:
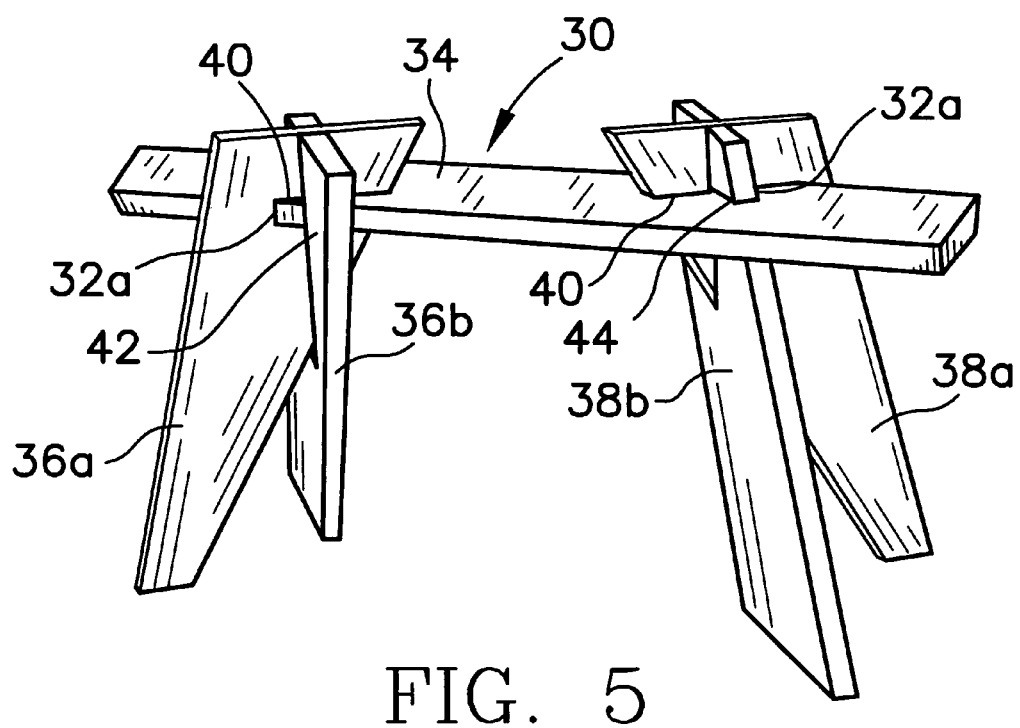
FIG. 5 is a front elevational view of the third embodiment of the tetrahedral joint of the invention.

Referring now to FIG. 5, there is illustrated a third embodiment of the invention 30 employing two interconnected tetrahedral joints 30a, 30b of the invention forming a tetrahedral system in which a single horizontal member, generally designated by reference numeral 34 forms one of the three interconnecting pieces of the two tetrahedral joints 32a, 32b. Each of the tetrahedral joints 30a and 30b respectively include two vertical pieces 36a, 36b and 38a, 38b. In FIG. 5 the miter angle of the open slot 40 with respect to an edge in vertical 38a is 60°. The miter angle of the pair of open ended slots 42 in horizontal piece 34, and slots 44 in vertical pieces 36b and 38b are 30° with respect to the edge. The tilt angles of the slots 40, 42 and 44 in all members are 90°. The horizontal piece 34 not only joins the two tetrahedral joints 32a and 32b, but may serve as a horizontal support member. The widths of all slots 40, 42 and 44 are generally equal to the thicknesses of the pieces 34, 36a, 36b, 38a and 38b.

Figure 6:
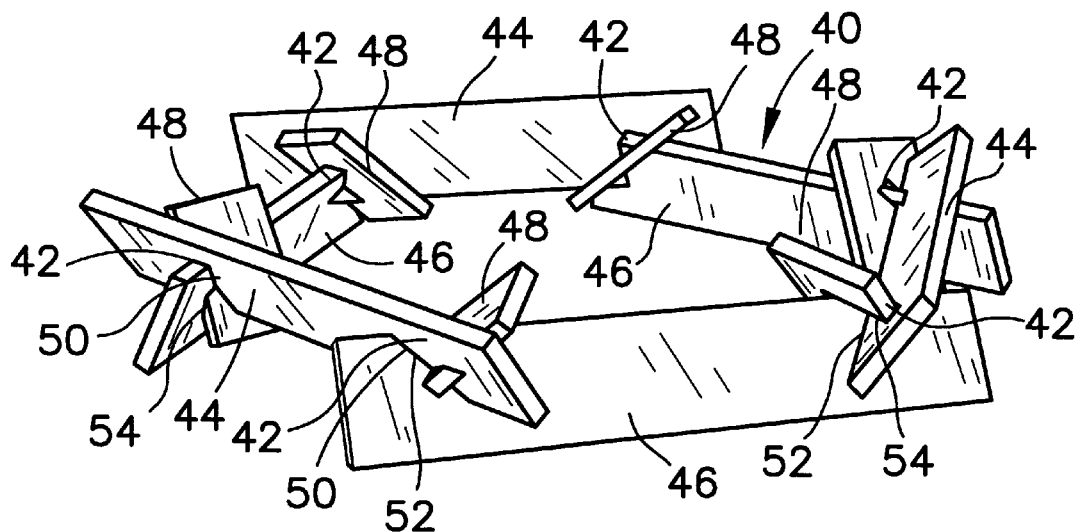
FIG. 6 a front elevational view of the fourth embodiment of the tetrahedral joint of the invention.

Referring to FIG. 6, there is illustrated a fourth embodiment of the tetrahedral joint system of the invention disposed in an interlocking hexagon arrangement, generally designated by reference numeral 40. The hexagonal arrangement 40 includes six identical tetrahedral joints 42, (similar to tetrahedral joint 2), interconnected by three angularly sloped upper horizontal pieces 44 and three lower horizontal pieces 46. Each upper horizontal piece 44 and lower horizontal piece form two pieces of the tetrahedral joints 42. The third piece of each tetrahedral joint 42 is formed by piece 48. The upper horizontal pieces 44 are formed with an open end slot 50 at each end portion. The lower horizontal pieces 46 are formed with an open ended slot 52 at each end. The third piece is formed with a single open slot 54. The miter angles of all slots 50, 52 and 54 are 45°, and the tilt angles are 90°. All slots are generally equal in width to the thickness of the pieces 44, 46 and 48.

Figure 7:
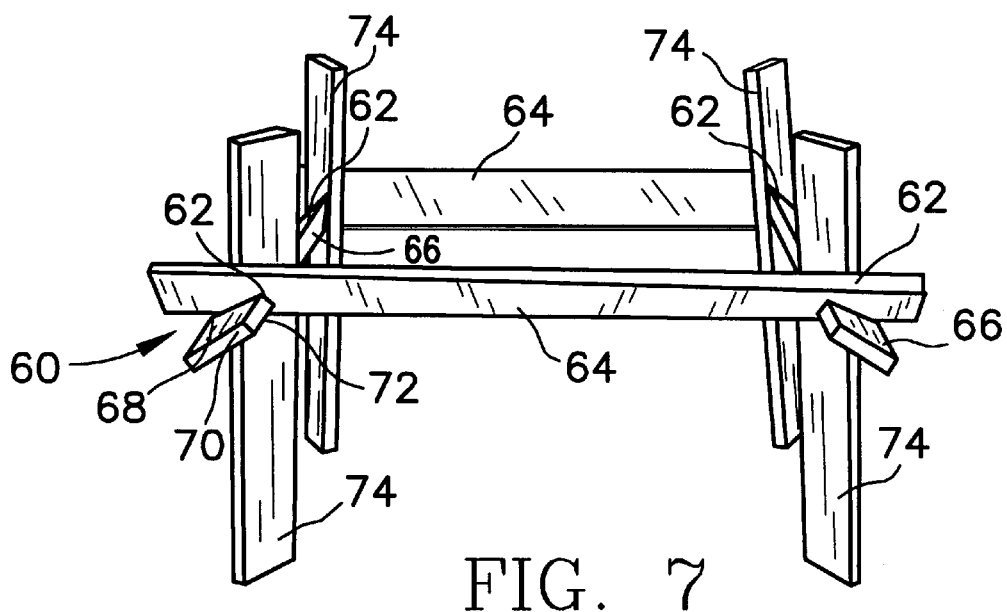
FIG. 7 is a front elevational view of the fifth embodiment of the tetrahedral joint of the invention.

Referring to FIG. 7, the tetrahedral joint system of the fifth embodiment of the invention, generally designated by reference numeral 60, is shown. The system 60 forms a frame-like rectangular configuration having four tetrahedral joints 62 of which the two joints on one diagonal are mirror images of those on the other diagonal. The structure 60 includes two horizontal front and back pieces 64 and two end horizontal pieces 66. Each of the pieces respectively have open slots 68, 70 on the ends which inter-fit with the slot 72 of one of four vertical pieces 74. The miter angles of slots 68, 70 and 72 are 45° with respect to an edge of the pieces 64, 66, and 74. The tilt angle of each open ended slot is 60° with respect to a face of the pieces. All slots have widths equal to the thicknesses of the pieces.

In the description of the foregoing five embodiments, particular miter and tilt angles have been specified. It is within the scope of the invention to vary the miter angles and tilt angles of each piece to form tetrahedral joints for desired configurations and applications. Although not intended to be so limited, the miter angle is preferably between 30° and 60°, although larger or smaller angles may be used. Similarly, tilt angles are between 90° and 45°, although other angles may be used to form the tetrahedral joints of the invention. The lengths of the three pieces may be varied as desired.

What is claimed is:

1. A tetrahedral joint comprising three flat pieces having equal thicknesses each defined by a flat surface, said three flat pieces each having a straight edge extending along an axis, said straight edge being perpendicular to said flat surface, each of said three flat pieces respectively having an open-ended slot cut along an axis into said straight edge through said flat surface, said open-ended slots forming miter angles of less than 90° respectively with respect to said edge of each of said three flat pieces, each of said open-ended slots having uniform widths generally equal to said thickness of said three flat pieces, said open-ended slots being cut through said flat pieces at tilt angles in the range of 90° or less with respect to said flat face, each of said three flat pieces being inserted across the width of the open-ended slot of another one of said three flat pieces and into the slot of the third piece to interconnect said three flat pieces to form a joint, said axis of each of said three open-ended slots intersecting each other at a common point when each three pieces are assembled; and said miter angle and said tilt angle of said open-ended slot of said third piece establishing the direction of said plane of said flat surface of each said flat piece being inserted.

2. The tetrahedral joint according to claim 1 wherein said three flat pieces extend vertically above and below each of said three open-ended slots.

3. The tetrahedral joint according to claim 1 wherein said angles of said open-ended slots relative to each said flat edges are equal.

4. The tetrahedral joint according to claim 3 wherein each of said open-ended slots are cut at tilt angles of 90° with respect to said flat face of said three flat pieces.

5. The tetrahedral joint according to claim 4 wherein said angles of said open-ended slots from each of said flat edges are cut at 45°.

6. The tetrahedral joint according to claim 1 wherein each of said open-ended slots are cut to form said miter angle in the range of selected angles from 30° to 60° with respect to each of said edges.

7. The tetrahedral joint according to claim 1 wherein said tilt angles with respect to each of said flat faces are in the range of 90° to 45°.

8. The tetrahedral joint according to claim 1 wherein each of said open-ended slots are cut at approximately 55° angles with respect to each of said edges and 45° with respect to each of said faces.

9. The tetrahedral joint according to claim 1 wherein said three flat pieces extend from said joint to form a tripod configuration having three legs.

* * * * *